(12) United States Patent
Yan et al.

(10) Patent No.: US 12,471,000 B2
(45) Date of Patent: Nov. 11, 2025

(54) LOOP DETECTION METHOD AND LOOP BREAK METHOD FOR MESH NETWORK

(71) Applicant: Airoha Technology (Suzhou) Limited, Suzhou (CN)

(72) Inventors: Fei Yan, Nanjing (CN); Li-Dong Hu, Nanjing (CN)

(73) Assignee: AIROHA TECHNOLOGY (SUZHOU) LIMITED, Suzhou (CN)

( * ) Notice: Subject to any disclaimer, the term of this patent is extended or adjusted under 35 U.S.C. 154(b) by 508 days.

(21) Appl. No.: 17/679,491

(22) Filed: Feb. 24, 2022

(65) Prior Publication Data

US 2023/0142790 A1 May 11, 2023

(30) Foreign Application Priority Data

Nov. 5, 2021 (TW) .................................. 110141248

(51) Int. Cl.
| | |
|---|---|
| *H04W 40/24* | (2009.01) |
| *H04W 24/04* | (2009.01) |
| *H04W 84/12* | (2009.01) |
| *H04W 84/18* | (2009.01) |

(52) U.S. Cl.
CPC ........... *H04W 40/24* (2013.01); *H04W 24/04* (2013.01); *H04W 84/12* (2013.01); *H04W 84/18* (2013.01)

(58) Field of Classification Search
CPC ..... H04W 40/24; H04W 24/04; H04W 84/12; H04W 84/18
USPC ......................................................... 370/255
See application file for complete search history.

(56) References Cited

U.S. PATENT DOCUMENTS

| | | | | |
|---|---|---|---|---|
| 5,014,262 A | * | 5/1991 | Harshavardhana | H04L 45/18 370/254 |
| 8,902,793 B2 | * | 12/2014 | Tzeng | H04L 45/48 709/239 |
| 2007/0091856 A1 | * | 4/2007 | Raina | H04W 40/24 370/392 |
| 2012/0263165 A1 | * | 10/2012 | Zakrzewski | H04W 56/009 370/350 |
| 2013/0191688 A1 | * | 7/2013 | Agarwal | H04L 41/12 714/E11.178 |
| 2015/0063123 A1 | * | 3/2015 | Wang | H04L 45/125 370/238 |

(Continued)

FOREIGN PATENT DOCUMENTS

| | | |
|---|---|---|
| CN | 1968205 A | 5/2007 |
| CN | 101170462 A | 4/2008 |

(Continued)

OTHER PUBLICATIONS

"Cui, Displaying and Analyzing Multicast Distribution Topology Graph Algorithm, Dec. 17, 2014, CN 104219113" (Year: 2014).*

*Primary Examiner* — Kevin C. Harper
(74) *Attorney, Agent, or Firm* — BACON & THOMAS, PLLC

(57) ABSTRACT

The present invention provides a loop detection method applicable to a mesh network including a plurality of links among a plurality of devices, including: creating a neighbor graph based on a topology maintenance message, wherein the neighbor graph represents a network structure of the mesh network; traversing the neighbor graph; and detecting whether there is a loop existing in the mesh network according to a result from traversing the neighbor graph.

11 Claims, 8 Drawing Sheets

(56) References Cited

U.S. PATENT DOCUMENTS

| | | | |
|---|---|---|---|
| 2015/0146655 A1* | 5/2015 | Hui | H04W 40/02 370/329 |
| 2017/0019165 A1* | 1/2017 | Ramasamy Chinannan | H04W 88/08 |
| 2022/0116318 A1* | 4/2022 | Luo | H04L 45/48 |
| 2023/0013392 A1* | 1/2023 | Xu | G06F 16/9024 |

FOREIGN PATENT DOCUMENTS

| | | |
|---|---|---|
| CN | 103346556 A | 10/2013 |
| CN | 108599970 A | 9/2018 |

* cited by examiner

LOOP DETECTION METHOD AND LOOP BREAK METHOD FOR MESH NETWORK

CROSS REFERENCE TO RELATED APPLICATION

This application claims the benefits of the Taiwanese Patent Application Serial Number 110141248, filed on Nov. 5, 2021, the subject matter of which is incorporated herein by reference.

BACKGROUND OF THE INVENTION

1. Field of the Invention

The present invention relates to a mesh network loop detection method, and particularly to a mesh network loop detection method based on a directed graph search.

2. Description of Related Art

The EasyMesh network technology is a further intelligent networking technology proposed by Wi-Fi Alliance. The EasyMesh network technology is Wi-Fi networks suitable for use in residences and a small-sized business, with advantages of supporting more simultaneous services and achieving higher throughput when running in Wi-Fi 6; allowing placement of multiple access points to extend coverage; providing seamless and secure login and configuration of devices by using QR codes via Wi-Fi Easy Connect technology, self-organizing and self-optimizing networks to collect advanced diagnostic information, facilitating service provider support through Wi-Fi data elements, and responding to network conditions to maximize its performance; prioritizing low-latency applications when needed and directing devices to route to a best connection without interruption; and supporting adding EasyMesh access points from multiple suppliers.

For Wi-Fi network employing the EasyMesh network technology (hereinafter, the EasyMesh network), once a loop exists, the entire EasyMesh network may be paralyzed. Therefore, there is a need to provide a novel mesh network loop detection method to solve the aforementioned problem.

SUMMARY OF THE INVENTION

In view of this, the present invention provides, for the EasyMesh network, a novel mesh network loop detection method, which can detect whether there is a loop existing based on directed graph search for physical ports, and accordingly disconnect the found loop for achieving loop break.

According to one aspect of the present invention, a loop detection method is provided. The loop detection method is applicable to a mesh network including a plurality of links among a plurality of devices. The loop detection method includes: creating a neighbor graph based on a topology maintenance message, wherein the neighbor graph represents a network structure of the mesh network; traversing the neighbor graph; and detecting whether there is a loop existing in the mesh network according to a result from traversing the neighbor graph.

Optionally, or preferably, the creating the neighbor graph based on the topology maintenance message further includes: exchanging the topology maintenance message, so that any device of the devices acquires neighbor information from any other device.

Optionally, or preferably, the creating the neighbor graph based on the topology maintenance message further includes: generating the neighbor graph by collecting the neighbor information from the devices.

Optionally, or preferably, the neighbor graph is represented by a matrix.

Optionally, or preferably, in the matrix, for two devices in the devices, a value equal to 0 represents no link existing between the two devices, a value equal to 1 represents one link existing between the two devices, and a value equal to or greater than 2 represents multiple links existing between the two devices.

Optionally, or preferably, the traversing the neighbor graph further includes: selecting a current device from the devices; and for other devices in the devices, enumerating all reachable paths from the current device to the other devices by a graph path finding algorithm.

Optionally, or preferably, the graph path finding algorithm is a graph depth-first search algorithm, which uses a stack structure to record accessed device nodes in the other devices.

Optionally, or preferably, the detecting whether there is the loop existing in the mesh network according to the result from traversing the neighbor graph includes: if a quantity of the devices recorded in a stack state of the stack structure is greater than 2 and if a stack top device recorded in the stack structure is a neighbor of a stack bottom device recorded in the stack structure, determining an existence of the loop and determining paths of loop according to the stack state.

According to another aspect of the present invention, there is provided a loop break method, which is applicable to break the loop detected by the aforementioned loop detection method, wherein any link of the links is one of a wired link, a wireless AP link, or wireless STA link. The loop break method includes: setting a wireless AP link weight greater than a wired link weight, and setting the wired link weight greater than a wireless STA link weight.

Optionally, or preferably, the loop break method of the present invention further includes: for each device, calculating a summation of connected link weights of all links connected to other devices, and configuring the summation as a device weight.

Optionally, or preferably, the loop break method of the present invention further includes: selecting among the devices a device having a minimal device weight as a candidate device for breaking loops, wherein the other devices in the devices are non-candidate devices, and a disconnection priority of the candidate device is higher than that of the non-candidate device.

Optionally, or preferably, the loop break method of the present invention further includes: if a plurality of pre-candidate devices are determined from the devices by comparison of the device weights among the devices, deciding the candidate device from the pre-candidate devices based on auxiliary weights, wherein the pre-candidate devices have the same device weight.

Other objects, advantages and novel features of the invention will become more apparent from the following detailed description when taken in conjunction with the accompanying drawings.

DETAILED DESCRIPTION OF THE EMBODIMENT

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as "first" or "second", are used to distinguish a plurality of elements having the same name, and it does not mean that there is essentially a level, a rank, an executing order, or a manufacturing order among the elements, except otherwise specified. A "first" element and a "second" element may exist together in the same component, or alternatively, they may exist in different components, respectively. The existence of an element described by a greater ordinal number does not essentially mean the existent of another element described by a smaller ordinal number.

In the present specification, a recitation "a feature X 'or' or 'and/or' another feature Y" means that the feature X exists alone, the feature Y exists alone, or the features X and Y exist together; and a recitation "a feature X 'and' another feature Y" means that the features X and Y exist together; the terms "include", "contain", "have", "comprise", means "include but not limited to", except otherwise specified.

Moreover, in the present specification, the terms, such as "system", "apparatus", "device", "module", or "unit", refer to an electronic element, or a digital circuit, an analogous circuit, or other general circuit, composed of a plurality of electronic elements, and there is not essentially a level or a rank among the aforementioned terms, except otherwise specified.

Moreover, a terminal or a server may include the aforementioned element(s), or be implemented in the aforementioned manner(s).

Figure 1:
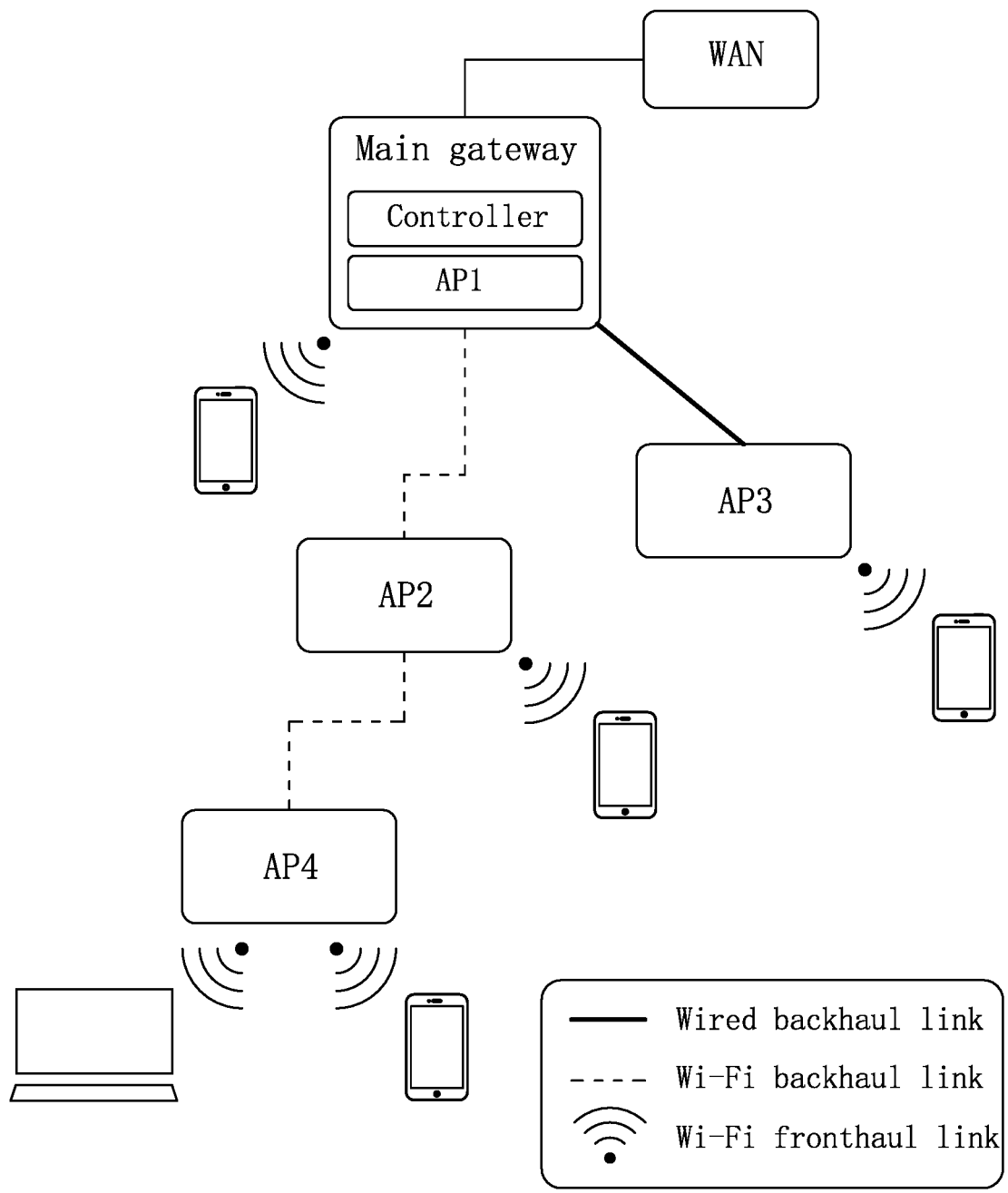
FIG. 1 is a schematic diagram of an EasyMesh network.
Figure 2:
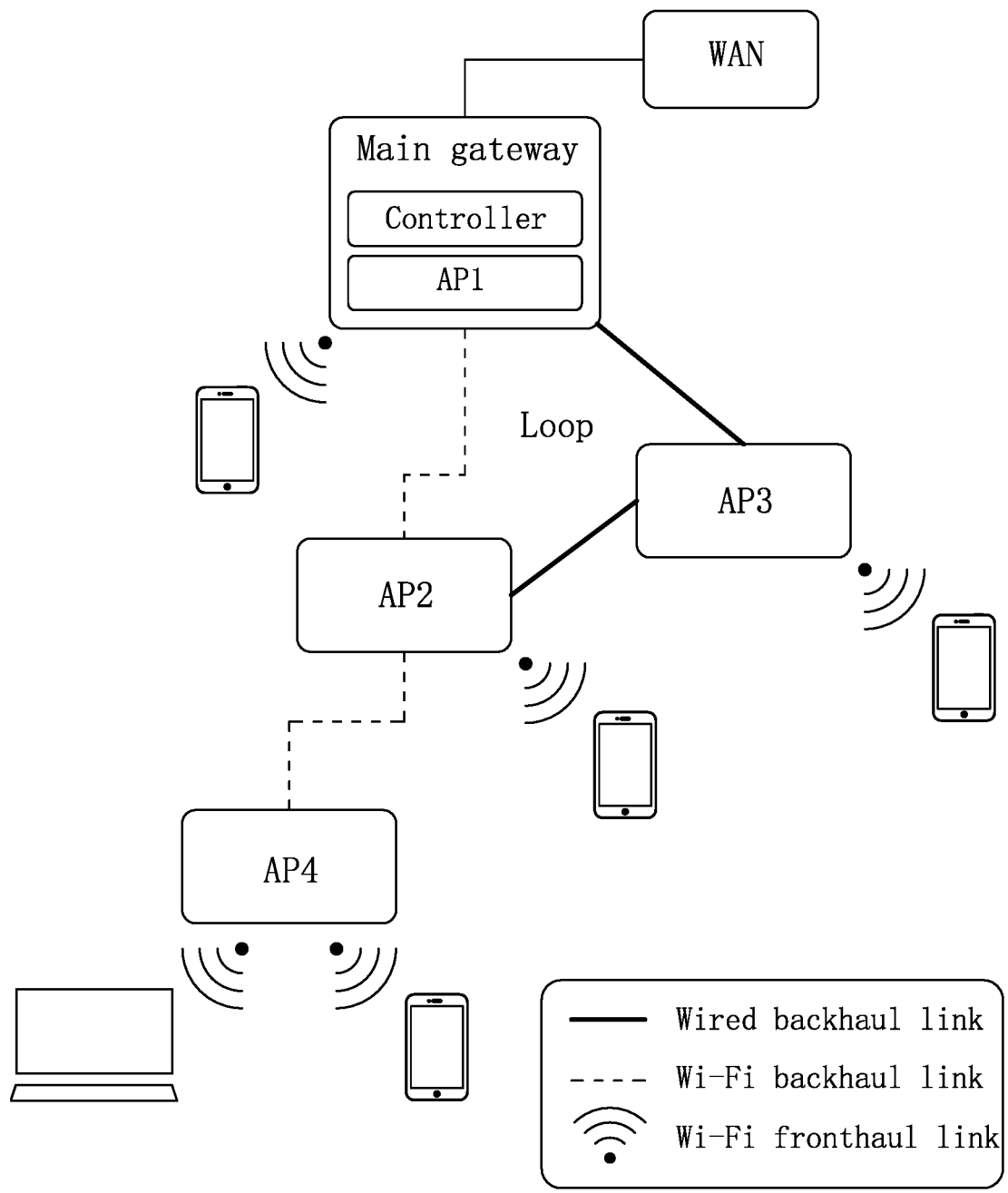
FIG. 2 is a schematic diagram of an EasyMesh network with a loop existing.

FIG. 1 is a schematic diagram of an EasyMesh network. FIG. 2 is a schematic diagram of an EasyMesh network with a loop existing.

As shown in FIG. 1, the EasyMesh network includes a controller and a plurality of agent devices AP2, AP3 and AP4. The controller is in charge of managing the entire EasyMesh network, and the agent devices AP2, AP3 and AP4 are all connected to the controller. The connection may be a direction connection or an indirect connection, and the connection may be implemented via a wired or wireless link. The controller typically locates in a main gateway, the main gateway is responsible for execution of management process for the controller, and at the same time the main gateway itself also includes an access point AP1, and the access point AP1 is accordingly under the management by the controller for economic purpose.

In normal cases, links between devices define a loop-free tree network; that it, there is no loop as shown in FIG. 1. In the EasyMesh network, when the links between the devices are kept unchanged, the network structure is relatively stable. However, when the links change, a loop may exist in the network. For example, as shown in FIG. 2, a link between the agent devices AP2 and AP3, which would otherwise not exist in FIG. 1, is established, and the controller and the agent devices AP2 and AP3 in combination define a loop. If the loop is not timely found and hence loop break is not being made, the entire network may be paralyzed and become unusable.

Therefore, there is a need for a mechanism that can timely monitor the network structure according to the change of links, and when a loop in the network is detected, a portion of the links is to be disconnected for achieving loop break.

The existing spanning tree protocol (STP) belongs to the second layer communications protocol in the open system interconnection (OSI) model. It is widely used in loop detection and loop break in a network composed of bridge devices to ensure a loop-free logical topology structure in Ethernet and to avoid a broadcast storm that consumes a lot of network resources.

However, the STP and the EasyMesh network technology are technically independent of each other. The STP does not use parameters defined in the technical specification of the EasyMesh network to perform the detection. The precondition to use the STP to detect the network structure is that every device in the EasyMesh network must support the STP, and that the STP in every device is enabled to acquire the parameters required during network detection under the STP. Even though that every device supports the STP with the STP enabled, since the STP needs information exchange during network structure detection and thus occupies transmission resources in the EasyMesh network. Therefore, in certain cases, the EasyMesh network is likely not to allow the execution of the STP.

The loop detection method of the present invention performs the detection based on parameters defined in the technical specification of the EasyMesh network, and therefore devices which can support the EasyMesh network technology can also support the loop detection method of the present invention. Additionally, unlike the STP in which additional check is required for assuring that devices are in an enabled status to provide parameters for loop detection, parameters required by the loop detection method of the present invention are acquired in a regular operation procedure in which devices operate by means of EasyMesh network technology, and no additional operation procedure is required to assure that the devices are in an enabled status. Furthermore, the loop detection method of the present invention does not need information exchange as required by the STP, so it will not significantly cost transmission resources in the EasyMesh network.

Figure 3:
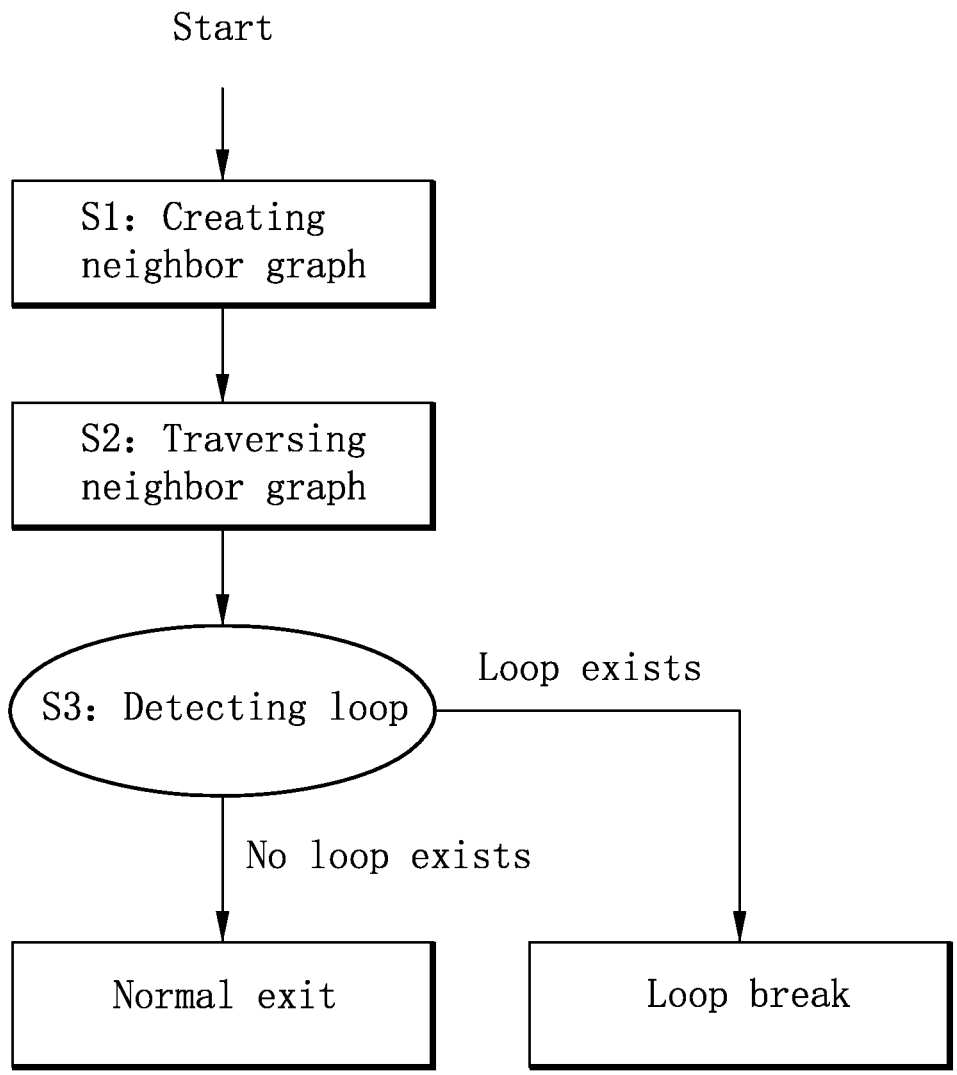
FIG. 3 is a flowchart of a mesh network loop detection method according to the first embodiment of the present invention.

FIG. 3 is a flowchart of a mesh network loop detection method according to the first embodiment of the present invention.

As shown in FIG. 3, the mesh network loop detection method of the present invention mainly includes a step of creating a neighbor graph (S1), a step of traversing the neighbor graph (S2), and a step of detecting a loop (S3). The mesh network loop detection method of the present invention is mainly applicable to an EasyMesh network. The mesh network loop detection method of the present invention may be implemented as software, a computer program, a computer readable storage medium, or a computer program product; and it may also be implemented as a system or a device composed of one or more chips or other electronic components.

The details of the respective steps will be explained in the following description.

Step S1 of Creating the Neighbor Graph in the First Embodiment

Step S1 of creating the neighbor graph is to use the neighbor graph to represent a network structure of a mesh network.

The EasyMesh network technology defines topology maintenance messages used to maintain the network structure. The topology maintenance messages include topology query or topology response. By exchanging these topology maintenance messages, any device in the EasyMesh network can acquire neighbor information from any other device also in the EasyMesh network, and in this way, the neighbor information from all of the devices may be collected to generate the neighbor graph to represent the network structure of the mesh network. The neighbor graph is preferably a directed graph. A directed graph is of a graphical structure, and a graphical structure is typically represented by a matrix. Therefore, a directed graph in the present invention is also represented by a matrix.

Figure 4:
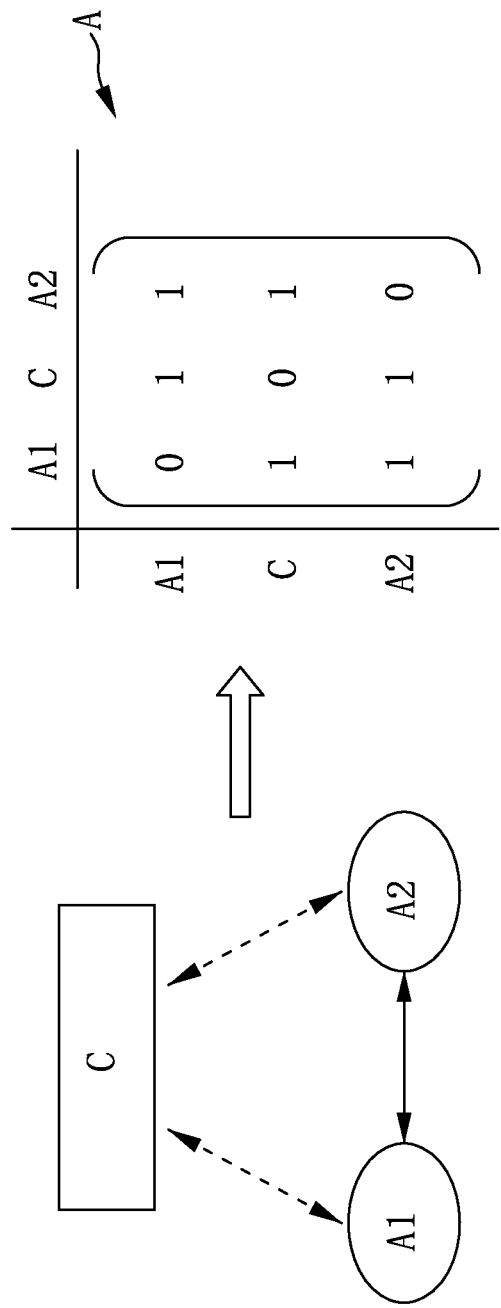
FIG. 4 is a schematic diagram illustrating the step of creating a neighbor graph according to the first embodiment of the present invention.

FIG. 4 is a schematic diagram illustrating Step S1 of creating the neighbor graph according to the first embodiment of the present invention.

A network structure shown in the left part of FIG. 4 includes three devices: a controller C and two agents A1 and A2. The two agents A1 and A2 are connected to the controller C respectively via wireless links (the wireless links are indicated by broken lines). The two agents A1 and A2 are connected to each other via a wired link (the wired link is indicated by a solid line). In this way, the network structure has a loop. Therefore, there is a need to detect the existence of the loop and then perform loop break.

For the three devices C, A1 and A2 in the network structure, after exchanging the topology maintenance messages, any device can acquire the neighbor information from any other device. For example, the neighbor information that the agent A1 can acquire includes the agent A1's own neighbor information (the controller C and the agent A2), the agent A2's neighbor information (the agent A1 and the controller C) and the controller C's neighbor information (the agent A1 and the agent A2).

Next, the acquired neighbor information is represented in the form of an N×N matrix A as a set of neighbor information, and in convenience of explanation, it may be called the neighbor graph in a suitable section in the present description, wherein N represents a quantity of devices in the network structure. Each value of the element in the matrix A represents a quantity of links. For example, the value "0" represents no direct link existing between the two devices, the value "1" represents one direct link existing between the two devices, and the value "2" or greater represents multiple direct links existing between the two devices.

The neighbor graph shown in the right part of FIG. 4 represents the network structure shown in the left part of FIG. 4, wherein the neighbor graph in the right part of FIG. 4 is built by the agent A1, and therefore, a parameter in a first column and a parameter in a first row of the matrix A are A1, but the present invention is not limited thereto. In detailed, referring to the left part of FIG. 4, the agent A1 and the controller C have one direct link and no multiple links therebetween. Therefore, referring to the right part of FIG. 4, $A_{1,2}$ is 1. Similarly, the controller C and the agent A1 have one direct link and no multiple links therebetween. Therefore, referring to the right part of FIG. 4, $A_{2,1}$ is 1. The remaining values in the matrix A are obtained in a similar way. In the network structure shown in left part of FIG. 4, there are no multiple direct links, and hence there is no value "2" or greater presented in the matrix A.

Step S2 of Traversing the Neighbor Graph in the First Embodiment

Step S2 of traversing the neighbor graph is to search the mesh network according to the neighbor graph created in Step S1 of creating the neighbor graph.

After the devices C, A1 and A2 generate their respective neighbor graphs, all reachable paths from a current device to other devices are enumerated by a graph path finding algorithm, and during the enumeration, it is determined whether a loop exists by using a device to access (or visit) a stack.

Figure 5:
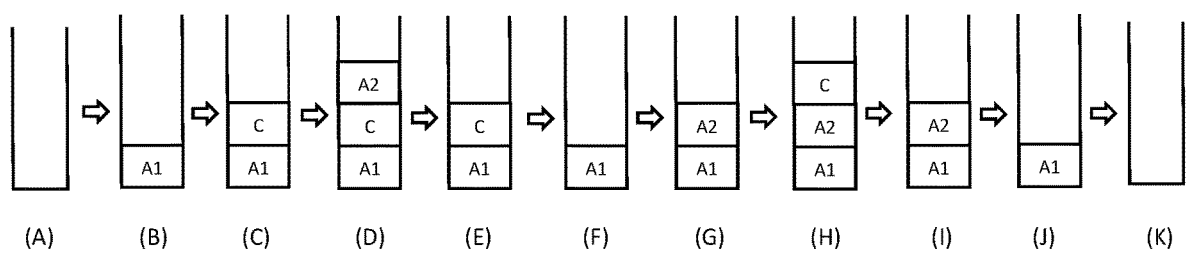
FIG. 5 is a stack state change diagram during executing a graph path finding algorithm to traverse the neighbor graph according to the first embodiment of the present invention.

FIGS. 5 (A) to 5(K) are schematic diagrams illustrating respective intermediate stages of process of traversing a neighbor graph with a graph path finding algorithm according to the first embodiment of the present invention.

In particular, the graph path finding algorithm has an execution process similar to the graph Depth-First Search (DFS) algorithm, which use a stack structure to record accessed device nodes, and state change in the stack structure reflects a path change. In embodiments shown in FIGS. 5 (A) to 5 (K), the agent A1 in the network structure in FIG. 4 serves as a beginning node in the traversing process, which will be described in detailed as follows. For other devices, state changes in their respective stack structures can be acquired by similar processes.

Referring to FIG. 5 (A), an initial state of a stack structure is shown.

Referring to FIG. 5 (B), the agent A1 serves as a current device, and accordingly is pushed into the bottom of the stack structure (hereinafter, a stack bottom device). Next, since in FIG. 4 the matrix A's $A_{1,2}$ has a value "1", it is determined that a device directly connected to the agent A1 is the controller C. Accordingly, the stack structure changes from FIG. 5 (B) to FIG. 5 (C).

Referring to FIG. 5 (C), the controller C is pushed into the stack and on the agent A1. Next, since in FIG. 4 the matrix A's $A_{2,3}$ has a value "1", it is determined that a device directly connected to the controller C is the agent A2. Accordingly, the stack structure changes from FIG. 5 (C) to FIG. 5 (D).

Referring to FIG. 5 (D), the agent A2 is pushed into the stack and on the controller C. Next, since in FIG. 4 the matrix A's $A_{3,1}$ and $A_{3,2}$ each has a value "1", it is determined that devices directly connected to the agent A2 are the agent A1 and the controller C. However, the agent A1 and the controller C have already presented in the stack structure. Therefore, there should be no more push action into the stack, and the stack structure changes from FIG. 5 (D) to FIG. 5 (E), and the agent A2 is popped out of the stack from the controller C.

Referring to FIG. 5 (E), according to the matrix A in FIG. 4, it is determined that except the agents A1 and A2, there is no device directly connected to the controller C. Therefore, the stack structure changes from FIG. 5 (E) to FIG. 5 (F), and the controller C is popped out of the stack from the agent A1.

Referring to FIG. 5 (F), according to the matrix A in FIG. 4, it is determined that in addition to the controller C, the agent A2 is directly connected to the agent A1. Therefore, the stack structure changes from FIG. 5 (F) to FIG. 5 (G), and the agent A2 is pushed into the stack and on the agent A1.

Changes in the stack structure from FIG. 5 (G) to FIG. 5 (I) are similar to those from FIG. 5 (C) to FIG. 5 (J), so the detailed descriptions are omitted. Finally, when it comes up to FIG. 5 (K), the stack structure returns to the initial state, and the enumeration is complete.

Step S3 of Detecting the Loop in the First Embodiment

Step S3 of detecting the loop is to determine whether there is a loop according to a searching result from the step of traversing the neighbor graph, wherein if it is determined that there is no loop, it can normally exit the mesh network loop detection method.

In the present invention, the rule to determine whether there is a loop is that: when a quantity of the accessed devices in the stack is greater than 2, and the stack top device is a neighbor of the stack bottom device (that is, the current device), it means that the network has a loop. For example, in the stack state change diagram as shown in FIGS. 5 (A) to 5 (K), when the traverse operation is performed until the stack state in FIG. 5 (D) (that is, A1→C→A2), the quantity of devices recorded in the stack state is 3, that is, the quantity of devices is greater than 2, as well as by looking up the neighbor graph in the right part of FIG. 4, for example, according to the fact that $A_{1,3}$ is 1, it can be observed that the stack top device A2 is the neighbor device of the stack bottom device (that is, the current device) A1. As a result, it is determined that the network has a loop, and in this case, the loop path is A1-C-A2-A1.

the Step of Loop Break in the First Embodiment

If it is determined that there is a loop, it enters the step of loop break. That is, it is not necessary to perform the step of loop break.

In the present invention, the step of loop break is preferably to perform loop break based on link weights. In particular, at first, a weight is assigned to each link according to a specific rule, which is called the link weight. Then, for each device, a summation of link weights is calculated for all links connected to other devices, which is called a device weight; finally, a device having a minimal device weight is selected as a candidate device for breaking loops, and the loop break is performed by disconnecting the wireless or wired link of the candidate device.

In the present invention, when designing the specific rule for the EasyMesh network, it can be found that there are three types of links among devices, including a wired link, a wireless access point (AP) link and a wireless station (STA) link. The wireless AP link is a wireless downlink, and the wireless STA link is a wireless uplink. The wired link in the present invention is Ethernet. What should be explained is that the wired link is typically better than the wireless link in terms of its stability for example, but the wireless AP link in the wireless links is a one-to-many link, which is usually connected to a plurality of devices, and therefore, it is easier to predict the topology structure after disconnecting the wired link than disconnecting a wireless AP link, so as to avoid an undesired circumstance in which a device, which would otherwise be not intended to be disconnected from the EasyMash network, is disconnected from the EasyMesh network. Therefore, when a loop exists in the network and there is a need to disconnect a link, the wireless STA link has the highest disconnection priority, the wired link has the second disconnection priority, and the wireless AP link has the lowest disconnection priority. For the aforementioned reasons, it is preferable that weights of the three types of links are set as follows: the wireless AP link weight LW_AP is greater than the wired link weight LW_ETHERNET, and the wired link weight LW_ETHERNET is greater than the wireless STA link weight LW_STA, that is:

LW_AP>LW_ETHERNET>LW_STA

It should be noted that, the aforementioned weight settings are applicable to the EasyMesh network, but the present invention is not limited thereto. The weight setting may be adjusted, depending on an employed specific network technology.

In this way, after weights are set to respective links in the network structure according to different types of link, at the same time device weights can be calculated. When the network has a loop, a device having the minimal device weight is selected as the candidate device for loop break. However, when there are two or more devices having the minimal device weight, other criterion, for example, by comparing their media access control (MAC) addresses, are required for further consideration in order to finally select the candidate device for loop break. In other words, in the present invention, the primary weight to decide the candidate device is set according to a type of links, and the auxiliary weight is set according to a MAC address. Of course, more kinds of weights may be introduced, set according to other device parameters, to finally select the candidate device for loop break.

Figure 6:
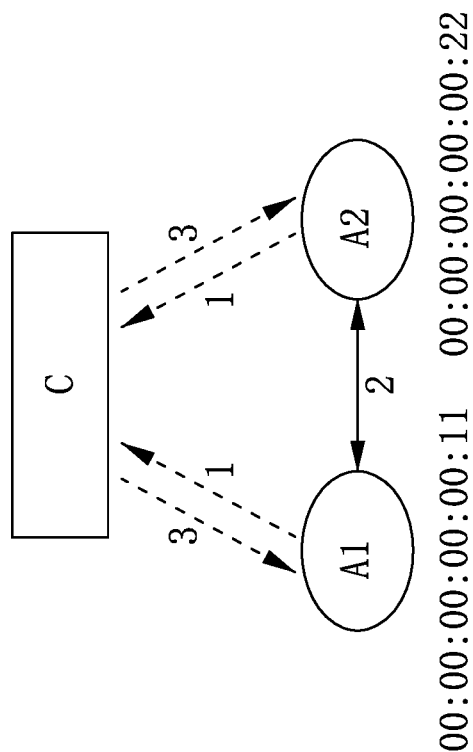
FIG. 6 is a schematic diagram illustrating weight settings in the step of loop break according to the first embodiment of the present invention.

FIG. 6 is a schematic diagram illustrating weight settings in the step of loop break according to the first embodiment of the present invention.

In FIG. 6, the controller C is connected to a plurality of devices via wireless AP links, and in particular, the links from controller C toward the agents A1 and A2 are the wireless AP links, with their weights LW_AP set to "3"; the links from the agents A1 and A2 toward the controller C are merely wireless STA links, with theirs weight LW_STA set to "1"; the link between the two agents A1 and A2 is a wired link, with its weight LW_ETHERNET set to "2". In this way, such settings satisfy the condition of LW_AP>LW_ETHERNET>LW_STA. The aforementioned values are merely convenient examples, and other values satisfying the aforementioned condition may be used.

Next, for each device, a summation of link weights is calculated for all links built by said device, which is called a device weight. Each device weight is calculated as follows: the controller C builds the two wireless AP links, wherein the wireless STA link is not built by the controller C, so when calculating device weight of the controller C, the wireless STA link weight should not be taken into consideration. Accordingly, the controller C's device weight is 3+3=6. The agent A1 builds the wireless STA link and the wired link, and therefore the agent A1's device weight is 1+2=3. Similarly, the agent A2's device weight is also 1+2=3.

Now, since the controller C has a maximal device weight, it should not be selected to be a candidate device. The agent A1 and the agent A2 both have the minimal device weight, and therefore, there is a need to introduce the auxiliary weight, that is, to compare MAC addresses of the agent A1 and the agent A2, select one as the candidate device from the agent A1 and the agent A2. In this case, the agent A1's MAC address is 00:00:00:00:00:11, and the agent A2's MAC address is 00:00:00:00:00:22, the agent A1's MAC address is smaller than the agent A2's MAC address, and the agent A1 is therefore selected as the candidate device. In other embodiments, it is also possible to select a device having greater MAC address as a candidate device. Of course, any other selection way is also possible, as long as the candidate device for the purpose of loop break is able to be determined.

After the candidate device is selected, the link built by the candidate device having smaller weight should be disconnected. In the embodiment of FIG. 6, the candidate device is the agent A1, and the links built by the agent A1 are the wireless STA link and the wired link. Since the wired link weight LW_ETHERNET is greater than the wireless STA link weight LW_STA, the wireless STA link should be disconnected. Once the wireless STA link is disconnected, the wireless AP link between the controller C and the agent A1 will be accordingly disconnected, the controller C does not have to actively disconnect the wireless AP link between the agent A1 and the controller C. Accordingly, the network structure does not have the loop.

Step S1 of Creating the Neighbor Graph in the Second Embodiment

Figure 7:
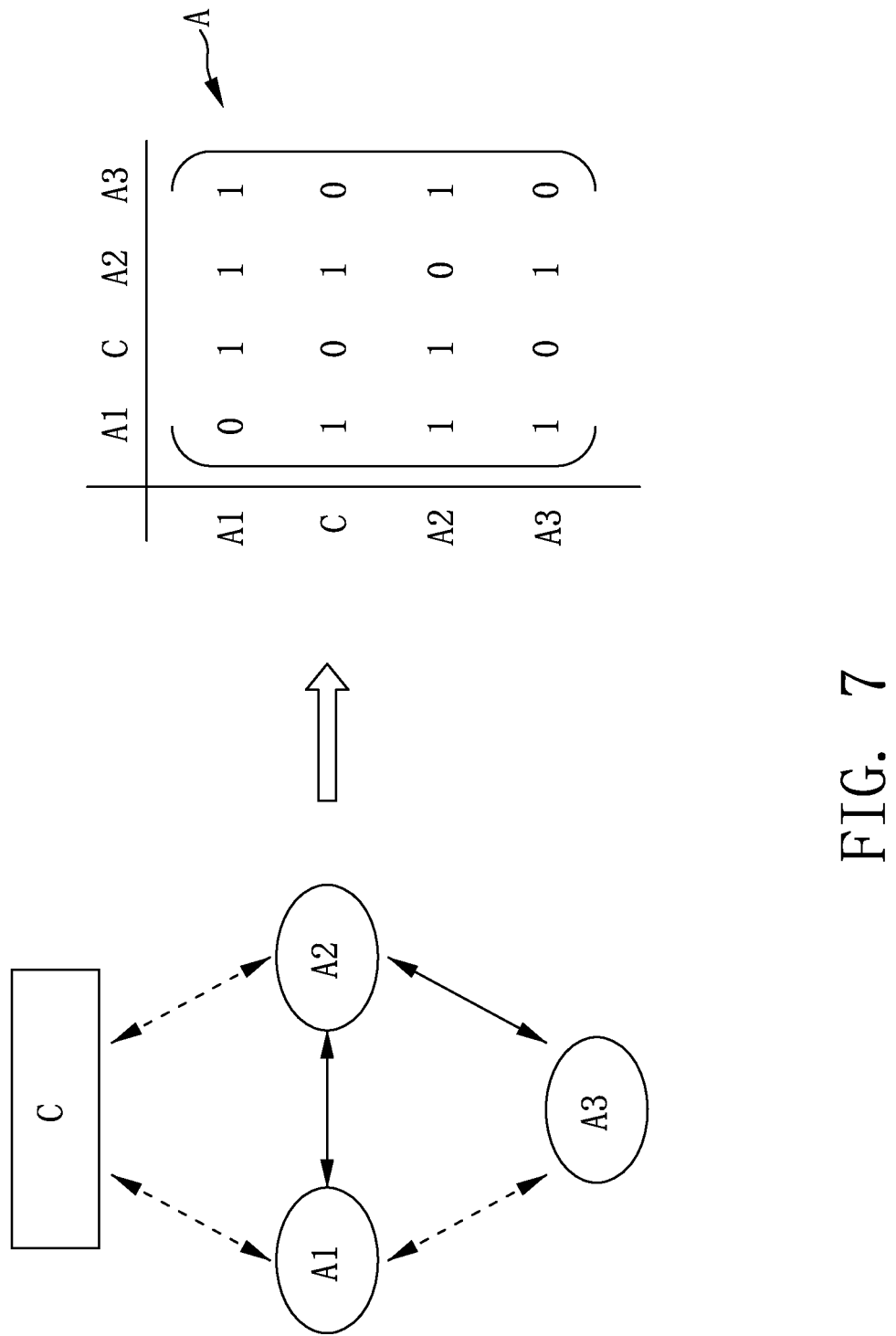
FIG. 7 is a schematic diagram illustrating the step of creating a neighbor graph according to the second embodiment of the present invention.

FIG. 7 is a schematic diagram illustrating Step S1 of creating a neighbor graph according to the second embodiment of the present invention. In comparison between the two embodiments, the network structure in the embodiment of FIG. 4 includes three devices C, A1 and A2, while the network structure in the embodiment of FIG. 7 includes four devices C, A1, A2 and A3. It can be seen that the present invention can be expanded into a network structure including more devices.

In particular, a network structure as shown in the left part of FIG. 7 includes a controller C and three agents A1, A2 and A3. The controller C is connected to the agent A1 via a wireless link (the wireless links are indicated by broken lines), the controller C is connected to the agent A2 via a wireless link, and the two agents A1 and A2 are connected to each other via a wired link (the wired link is indicated by a solid line). Moreover, the agent A3 is connected to the agent A1 via a wireless link, and the agent A3 is then connected to the agent A2 via a wired link. In this way, the network structure has a plurality of loops, and there is a need to detect existence of loops and then perform loop break.

After all of the network devices C, A1, A2 and A3 exchange topology maintenance messages, any device can acquire neighbor information from any other device. Next, the acquired neighbor information is represented in the form of a matrix as a neighbor graph. The right part of FIG. 7 shows the agent A1's neighbor graph. Next, the acquired neighbor information is represented in the form of a 4×4 matrix A as a set of neighbor information. Each value of the element in the matrix A represents a quantity of links, and the relevant description can be referred back to the first embodiment of the present invention.

The neighbor graph as shown in the right part of FIG. 7 represents the network structure as shown in the left part of FIG. 7, wherein the neighbor graph in the right part of FIG. 7 is built by the agent A1, and therefore, a parameter in the first column and a parameter in the first row of the matrix A is A1, but the present invention is not limited thereto. The construction of the 4×4 matrix A in the right part of FIG. 7 is similar to that of the 3×3 matrix A in the right part of FIG. 4, so the detailed description is omitted.

Step S2 of Traversing the Neighbor Graph in the Second Embodiment

After the devices C, A1, A2 and A3 generate their respective neighbor graphs, all reachable paths from a current device to other devices are enumerated by a graph path finding algorithm, and during the enumeration, it is determined whether a loop exists by using a device to access (or visit) a stack.

Figure 8:
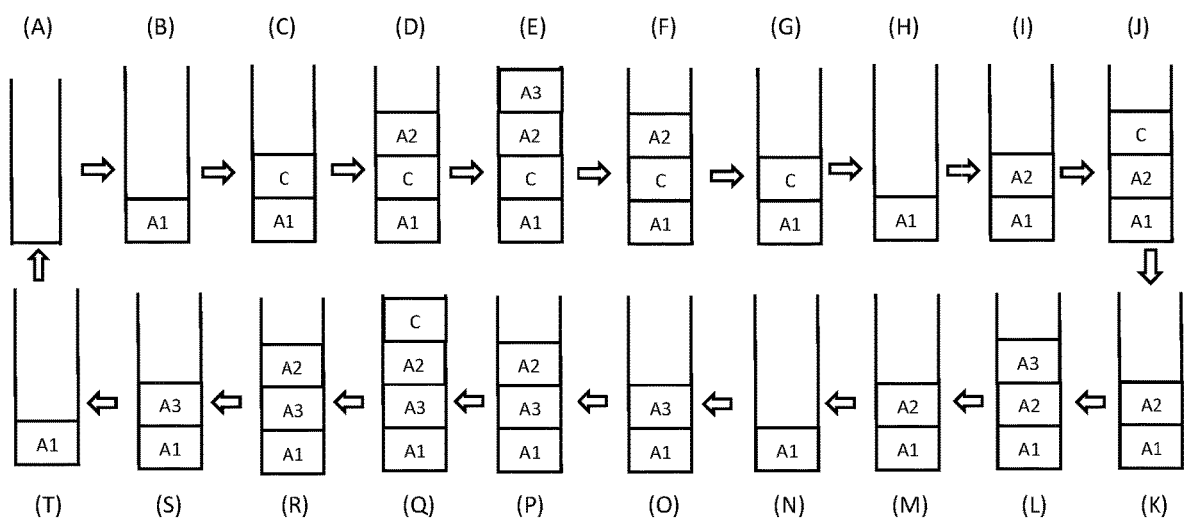
FIG. 8 is a stack state change diagram during executing a graph path finding algorithm to traverse the neighbor graph according to the second embodiment of the present invention.

FIGS. 8 (A) to 8 (T) are schematic diagrams illustrating respective intermediate stages of process of traversing a neighbor graph with a graph path finding algorithm according to the second embodiment of the present invention.

In particular, referring to FIG. 8 (A), an initial state of a stack structure is shown.

Referring to FIG. 8 (B), the agent A1 serves as a current device, and accordingly is pushed into the bottom of the stack structure (hereinafter, a stack bottom device). Next, since in FIG. 7 the matrix A's $A_{1,2}$ has a value "1", it is determined that a device directly connected to the agent A1 is the controller C. Accordingly, the stack structure changes from FIG. 8 (B) to FIG. 8 (C).

Referring to FIG. 8 (C), the controller C is pushed into the stack and on the agent A1. Next, since in FIG. 7 the matrix A's $A_{2,3}$ has a value "1", it is determined that a device directly connected to the controller C is the agent A2.

Referring to FIG. 8 (D), the agent A2 is pushed into the stack and on the controller C. Next, since in FIG. 7 the matrix A's $A_{3,4}$ has a value "1", it is determined that a device directly connected to the agent A2 is the agent A3.

Referring to FIG. 8 (E), the agent A3 is pushed into the stack and on the agent A2. Next, since in FIG. 7 the matrix A's $A_{4,1}$ and $A_{4,3}$ each has a value "1", it is determined that devices directly connected to the agent A3 are the agent A1 and the agent A2. However, the agent A1 and the agent A2 have already presented in the stack structure. Therefore, there should be no more push action into the stack, and the stack structure changes from FIG. 8 (E) to FIG. 8 (F), and the agent A3 is popped out of the stack from the agent A2.

Referring to FIG. 8 (F), according to the matrix A in FIG. 7, it is determined that except the controller C, the agents A1 and the agent A3, there is no device directly connected to the agent A2. Therefore, the stack structure changes from FIG. 8 (F) to FIG. 8 (G), and the agent A2 is popped out of the stack from the controller C.

Referring to FIG. 8 (G), according to the matrix A in FIG. 7, it is determined that except the agents A1 and A2, there is no device directly connected to the controller C. Therefore, the stack structure changes from FIG. 8 (G) to FIG. 8 (H), and the controller C is popped out of the stack from the agent A1.

Referring to FIG. 8 (H), the agent A1 serves as a current device, and it is still the stack bottom device in the stack structure. Next, since in FIG. 7 the matrix A's $A_{1,3}$ has a value "1", it is determined that a device directly connected to the agent A1 is the agent A2. Accordingly, the stack structure changes from FIG. 8 (H) to FIG. 8 (I).

Referring to FIG. 8 (I), the agent A2 is pushed into the stack and on the agent A1. Next, since in FIG. 7 the matrix A's $A_{3,2}$ has a value "1", it is determined that a device directly connected to the agent A2 is the controller C.

Referring to FIG. 8 (J), the controller C is pushed into the stack and on the agent A2. Next, since in FIG. 7 the matrix A's $A_{2,1}$ and $A_{2,3}$ each has a value "1", it is determined that devices directly connected to the controller C are the agents A1 and A2. However, the agents A1 and A2 have already presented in the stack structure. Therefore, there should be no more push action into the stack, and the stack structure changes from FIG. 8 (J) to FIG. 8 (K), and the controller C is popped out of the stack from the agent A2.

Next, since in FIG. 7 the matrix A's $A_{3,4}$ has a value "1", it is determined that a device directly connected to the agent A2 is the agent A3.

Referring to FIG. 8 (L), the agent A3 is pushed into the stack and on the agent A2. Next, since in FIG. 7 the matrix A's $A_{4,1}$ and $A_{4,3}$ each has a value "1", it is determined that devices directly connected to the agent A3 are the agents A1 and A2. However, the agents A1 and A2 have already presented in the stack structure. Therefore, there should be no more push action into the stack, and the stack structure changes from FIG. 8 (L) to FIG. 8 (M), and the agent A3 is popped out of the stack from the agent A2.

Referring to FIG. 8 (M), according to the matrix A in FIG. 7, it is determined that except the controller C, the agent A1 and the agent A3, there is no device directly connected to the agent A2. FIG. 8 (J) and FIG. 8 (L) have shown pushing the controller C, the agent A1 and the agent A3 into the stack on the agent A2. Therefore, there should be no more push action into the stack on the basis of the agent A2, and the stack structure changes from FIG. 8 (M) to FIG. 8 (N), and the agent A2 is popped out of the stack from the agent A1.

Referring to FIG. 8 (N), the agent A1 serves as a current device, and it is still the stack bottom device in the stack structure. Next, since in FIG. 7 the matrix A's $A_{1,4}$ has a value "1", it is determined that a device directly connected to the agent A1 is the agent A3. Accordingly, the stack structure changes from FIG. 8 (N) to FIG. 8 (O).

Referring to FIG. 8 (O), the agent A3 is pushed into the stack and on the agent A1. Next, since in FIG. 7 the matrix A's $A_{4,3}$ has a value "1", it is determined that a device directly connected to the agent A3 is the agent A2.

Referring to FIG. 8 (P), the agent A2 is pushed into the stack and on the agent A3. Next, since in FIG. 7 the matrix A's $A_{3,2}$ has a value "1", it is determined that a device directly connected to the agent A2 is the controller C.

Referring to FIG. 8 (Q), the controller C is pushed into the stack and on the agent A2. Next, since in FIG. 7 the matrix A's $A_{2,1}$ and $A_{2,3}$ each has a value "1", it is determined that devices directly connected to the controller C is the agent A1 and the agent A2. However, the agent A1 and the agent A2 have already presented in the stack structure. Therefore, there should be no more push action into the stack, and the stack structure changes from FIG. 8 (Q) to FIG. 8 (R), and the controller C is popped out of the stack from the agent A2.

Referring to FIG. 8 (R), according to the matrix A in FIG. 7, it is determined that except the controller C, the agent A1 and the agent A3, there is no device directly connected to the agent A2. Therefore, the stack structure changes from FIG. 8 (R) to FIG. 8 (S), and the agent A2 is popped out of the stack from the agent A3.

Referring to FIG. 8 (S) according to the matrix A in FIG. 7, it is determined that except the agent A1 and the agent A2, there is no device directly connected to the agent A3.

Therefore, the stack structure changes from FIG. 8 (S) to FIG. 8 (T), and the agent A3 is popped out of the stack from the agent A1.

Finally, when it comes up to FIG. 8 (T), the stack structure returns to the initial state, and the enumeration is complete.

The Step of Detecting the Loop in the Second Embodiment

In the stack state change diagram as shown in FIG. 8, for the stack state in FIGS. 8 (D), (E), (F), (J), (L), (P), (Q) and (R), it can be clearly seen that the stack state shows a quantity of the devices greater than 2, as well as by looking up the neighbor graph in the right part of FIG. 7, it can be seen that in those stack states, the stack top device is a neighbor device of the stack bottom device (that is, the current device), and therefore, it is determined that the network has a loop. For example, with reference to FIG. 8 (Q), the quantity of devices recorded in its stack state is 4, that is, the quantity of devices is greater than 2, as well as by looking up the neighbor graph in the right part of FIG. 7, it can be observed that the stack top device C is the neighbor device of the stack bottom device (that is, the current device) A1. As a result, it is determined that the network has a loop, and in this case, the loop path is A1-A3-A2-C-A1, that is, the outermost loop in the left part of FIG. 7. Similarly, other loops in the left part of FIG. 7 may be detected in a similar way.

The Step of Loop Break in the Second Embodiment

Similarly, in the second embodiment, primary weights are set by setting link weights according to the type of links, and after the link weights are set for the wired link, the wireless AP link, and the wireless STA link, with the summation of link weights of all links connected to each device called a device weight, a device having the minimal device weight is selected as a candidate device for breaking loops. If comparison of primary weights (that is, device weights) cannot decide a unique candidate device, but there are still many pre-candidate devices, it is possible to further introduce auxiliary weights, for example, to compare MAC addresses or other device parameters of pre-candidate devices, so as to finally select the candidate device for breaking loops, and to break the loop by disconnecting the wireless or wired link of the candidate device.

Although the present invention has been explained in relation to a plurality of embodiments, it is to be understood that many other possible modifications and variations can be made without departing from the spirit and scope of the invention as hereinafter claimed.

What is claimed is:

1. A loop detection method applicable to a mesh network including a plurality of links among a plurality of devices, the loop detection method including:
   exchanging a topology maintenance message between the devices;
   creating a neighbor graph based on the topology maintenance message, wherein the neighbor graph represents a network structure of the mesh network;
   traversing the neighbor graph; and
   detecting whether there is a loop existing in the mesh network according to a result from traversing the neighbor graph;

wherein the loop is formed by at least three devices of the plurality of devices, and each two of the at least three devices have a link of the plurality of links;
wherein the traversing the neighbor graph further comprises:
selecting a current device from the plurality of devices; and
for other devices in the plurality of devices, enumerating all reachable paths from the current device to the other devices by a graph path finding algorithm;
wherein the graph path finding algorithm is a graph depth-first search algorithm, which uses a stack structure to record accessed device nodes in the other devices;
wherein the detecting whether there is the loop existing in the mesh network according to the result from traversing the neighbor graph comprises:
if a quantity of the plurality of devices recorded in a stack state of the stack structure is greater than 2 and if a stack top device recorded in the stack structure is a neighbor of a stack bottom device recorded in the stack structure, determining an existence of the loop and determining paths of the loop according to the stack state.

2. The loop detection method of claim 1, wherein the creating the neighbor graph based on the topology maintenance message further comprises:
exchanging the topology maintenance message, so that any device of the plurality of devices acquires neighbor information from any other device.

3. The loop detection method of claim 2, wherein the creating the neighbor graph based on the topology maintenance message further comprises:
generating the neighbor graph by collecting the neighbor information from the plurality of devices.

4. The loop detection method of claim 3, wherein the neighbor graph is represented by a matrix.

5. The loop detection method of claim 4, wherein in the matrix, for two devices in the plurality of devices, a value equal to 0 represents no link existing between the two devices, a value equal to 1 represents one link existing between the two devices, and a value equal to or greater than 2 represents multiple links existing between the two devices.

6. A loop break method for a mesh network, the mesh network including a plurality of devices and links therebetween, each link having a link type the loop break method comprising:
acquiring information on an established link by exchanging a topology maintenance message between the devices;
setting a link weight of the link type;
deriving a device weight for each device based on link weights of links established by a device;
selecting, among the plurality of devices, a device based on a relative device weight among the devices as a candidate device; and
disconnecting at least a portion of links established by the candidate device.

7. The loop break method of claim 6, the step of deriving the device weight for each device based on link weights of links established by the device further comprising:
for each device, calculating a summation of link weights of all connected links connected to other devices; and
configuring the summation as the device weight.

8. The loop break method of claim 7, the step of selecting, among the plurality of devices, the device based on the relative device weight among the devices as the candidate device further comprising:
selecting, among the plurality of devices, a device having a minimal device weight as the candidate device, wherein the other devices in the plurality of devices are non-candidate devices, and a disconnection priority of the candidate device is higher than that of the non-candidate devices.

9. The loop break method of claim 8, further comprising:
if a plurality of pre-candidate devices are determined from the plurality of devices by comparison of the device weights among the plurality of devices, deciding the candidate device from the pre-candidate devices based on auxiliary weights, wherein the pre-candidate devices have the same device weight.

10. The loop break method of claim 6, wherein the link type comprises a wired link, a wireless access point (AP) link or a wireless station (STA) link.

11. The loop break method of claim 10, the step of setting the link weight of the link type further comprising:
setting a wireless AP link weight greater than a wired link weight, and setting the wired link weight greater than a wireless STA link weight.

* * * * *